US009658867B2

(12) United States Patent
Sreedhar et al.

(10) Patent No.: US 9,658,867 B2
(45) Date of Patent: May 23, 2017

(54) PRESERVING OBJECT CODE TRANSLATIONS OF A LIBRARY FOR FUTURE REUSE BY AN EMULATOR

(71) Applicant: Hewlett-Packard Development Company, L.P., Houston, TX (US)

(72) Inventors: Deepak Sreedhar, Bangalore (IN); Rajesh Kumar Chaurasia, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 919 days.

(21) Appl. No.: 13/951,100

(22) Filed: Jul. 25, 2013

(65) Prior Publication Data

US 2014/0358515 A1 Dec. 4, 2014

(30) Foreign Application Priority Data

May 30, 2013 (IN) .......................... 2381/CHE/2013

(51) Int. Cl.
G06F 9/455 (2006.01)
G06F 9/445 (2006.01)

(52) U.S. Cl.
CPC ........ G06F 9/4552 (2013.01); G06F 9/44521 (2013.01); G06F 2009/45583 (2013.01)

(58) Field of Classification Search
CPC ............... G06F 9/4552; G06F 9/45521; G06F 9/45525; G06F 2009/45583
USPC .................................................... 703/26, 23
See application file for complete search history.

(56) References Cited

U.S. PATENT DOCUMENTS

| 6,480,845 | B1* | 11/2002 | Egolf .................. G06F 9/45537 |
| 7,702,843 | B1* | 4/2010 | Chen ..................... G06F 9/5016 711/6 |
| 7,805,710 | B2 | 9/2010 | North |
| 8,103,850 | B2 | 1/2012 | Nair et al. |
| 8,200,987 | B2 | 6/2012 | Campbell et al. |
| 8,321,850 | B2 | 11/2012 | Bruening et al. |

(Continued)

OTHER PUBLICATIONS

Rosenblum, Mendel et al., "SimOS: A Fast Operating System Simulation Environment", Jul. 1994, Technical Report, Department of Electrical Engineering and Computer Science, Stanford University.*

(Continued)

*Primary Examiner* — Cedric D Johnson
(74) *Attorney, Agent, or Firm* — Hewlett Packard Enterprise Patent Department

(57) ABSTRACT

Provided is a method of preserving object code translations of a library for future reuse by an emulator. A munmap(2) system call is intercepted from an application for unmapping a mapped library memory address. A determination is made if an entry related to the mapped library memory address is present in a first predefined data structure. If said entry is present, a determination is made if the mapped library memory address corresponds to a library text or library data. If the mapped memory address corresponds to the library text, said entry is flagged as inactive in the first predefined data structure, and an object code translation of the library text is preserved in the mapped library memory address. If the mapped library memory address corresponds to the library data, contents of the mapped address are reset to zero.

17 Claims, 3 Drawing Sheets

(56) References Cited

U.S. PATENT DOCUMENTS

| | | | |
|---|---|---|---|
| 2003/0037178 A1* | 2/2003 | Vessey | G06F 9/54 719/319 |
| 2004/0181785 A1 | 9/2004 | Zwirner et al. | |
| 2005/0015756 A1* | 1/2005 | Brown | G06F 9/45516 717/136 |
| 2005/0050389 A1* | 3/2005 | Chaurasia | G06F 11/366 714/15 |
| 2006/0190924 A1* | 8/2006 | Bruening | G06F 12/0875 717/104 |
| 2008/0172661 A1* | 7/2008 | Chatterjee | G06F 8/443 717/158 |
| 2009/0113110 A1* | 4/2009 | Chen | G06F 9/4426 711/6 |
| 2013/0276056 A1* | 10/2013 | Epstein | G06F 21/604 726/1 |

OTHER PUBLICATIONS

Chadha, Vineet, "Provisioning Wide-Area Virtual Environments Through I/O Interposition: The Redirect-On-Write File System and Characterization of I/O Overheads in a Virtualized Platform", 2008, University of Florida.*
Rago, Stephen A., "UNIX System V Network Programming", 1993, Addison-Wesley Publishing Company, pp. 21-28, 49-53, and 273-274.*
Li, Jianhui et al., "Module-Aware Translation for Real-Life Desktop Applications", Jun. 11-12, 2005, VEE '05, ACM.*
Willmann, Paul, "Efficient Hardware/Software Architectures for Highly Concurrent Network Servers", Nov. 2007, Rice University.*
Park, Jiyong et al., "Quasistatic Shared Libraries and XIP for Memory Footprint Reduction in MMU-less Embedded Systems", Dec. 2008, ACM Transactions on Embedded Computing Systems, vol. 8, No. 1, Article 6, ACM.*
Bala, Vasanth et al., "Transparent Dynamic Optimization: The Design and Implementation of Dynamo", Jun. 1999, Hewlett-Packard.*
Fu, Yangchun et al., "Space Traveling Across VM: Automatically Bridging the Semantic Gap in Virtual Machine Introspection via Online Kernel Data Redirection", 2012, IEEE Symposium on Security and Privacy, IEEE Computer Society.*
King, Samuel T. et al., "Operating System Support for Virtual Machines", 2003, USENIX Annual Technical Conference, General Track.*
Payer, Mathias et al., "Fine-Grained User-Space Security through Virtualization", Mar. 9-11, 2011, VEE'11, ACM.*
Spillane, Richard P., "Rapid File System Development Using ptrace", Jun. 13-14, 2007, ExpCS, ACM.*
Reddi, Vijay Janapa et al., "Persistent Code Caching: Exploiting Code Reuse Across Executions and Applications", 2007, International Symposium on Code Generation and Optimization (GCO '07), IEEE Computer Society.*
Cifuentes, Cristina, "The University of Queensland Binary Translator (UQBT) Framework", The University of Queensland 1996-2001, Sun Microsystems Laboratories 1999-2001.
Li et al., "Module-aware Translation for Real-life Desktop Applications", ACM, VEE'05, Jun. 11-12, 2005, Chicago, Illinois, USA.

* cited by examiner

PRESERVING OBJECT CODE TRANSLATIONS OF A LIBRARY FOR FUTURE REUSE BY AN EMULATOR

CLAIM FOR PRIORITY

The present application claims priority under 35 U.S.C 119 (a)-(d) to Indian Patent application number 2381/CHE/2013, filed on May 30, 2013, which is incorporated by reference herein in its entirety.

BACKGROUND

Computing platforms evolve over time. Porting of applications to new computing platforms is not easy, for instance, due to unavailability of complete source code of an application to be ported. Binary translation is a technique that helps this transition process. Binary translation converts the binary code from one instruction set to another without requiring the high-level source code. Thus, even if the source code has been lost or was written in a language that is no longer supported, binary translation can help in migration of software to a new computing platform. Binary translation is primarily of two types: static and dynamic. Static binary translators perform a translation where an entire executable file is translated into an executable of the target computer platform. On the other hand, dynamic binary translators perform the translation of the code while the program is being executed by the translator.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Dynamic binary translators perform the translation from a source instruction set to a target host instruction set during the execution of the program. Dynamic binary translator looks at a short block of code, translates it and stores the translated code in a memory buffer for subsequent use. Code is only translated when its path is reached. Dynamic object code translation is routinely employed by cross platform software emulators.

A computer program may comprise several modules. All these modules need not be contained within a single object file. When a program comprises multiple object files, a linker combines these files (along with a library or libraries, if required) into a unified executable program. Dynamic loading is a mechanism by which a computer program can, at run time, load a library (or other binary) into memory, retrieve the addresses of functions contained in the library, perform those functions, and unloads the library from memory. In case of dynamic binary translation, if and when an application unloads a library dynamically an emulator has to purge the corresponding translations. If the library is loaded again the translations are required to be repeated. This is due to the reason that the address where a library is loaded in memory can change each time, rendering the old translations invalid. Needless to say, for applications that perform hundreds or thousands of dynamic library loads and unload, it can result in noticeable performance degradation under emulation.

Usually, and especially with legacy application environments, the libraries do not change during the execution of a program. Also, in many cases, there is sufficient room in address space to accommodate all (or most) of the libraries simultaneously, but the application architecture use dynamic load-unload as a simple way to purge transaction or session specific data.

Proposed solution describes a method by which an emulator can maintain the library code and its translations in memory across unload of the library. This enables reuse of the translations when an application loads and executes the library code again, thereby reducing the emulation overhead. Proposed solution therefore addresses the problem of performance degradation encountered when emulators have to retranslate library object code each time the dynamic library is loaded, even if the library has not changed in between the load and the previous unload.

Figure 1:
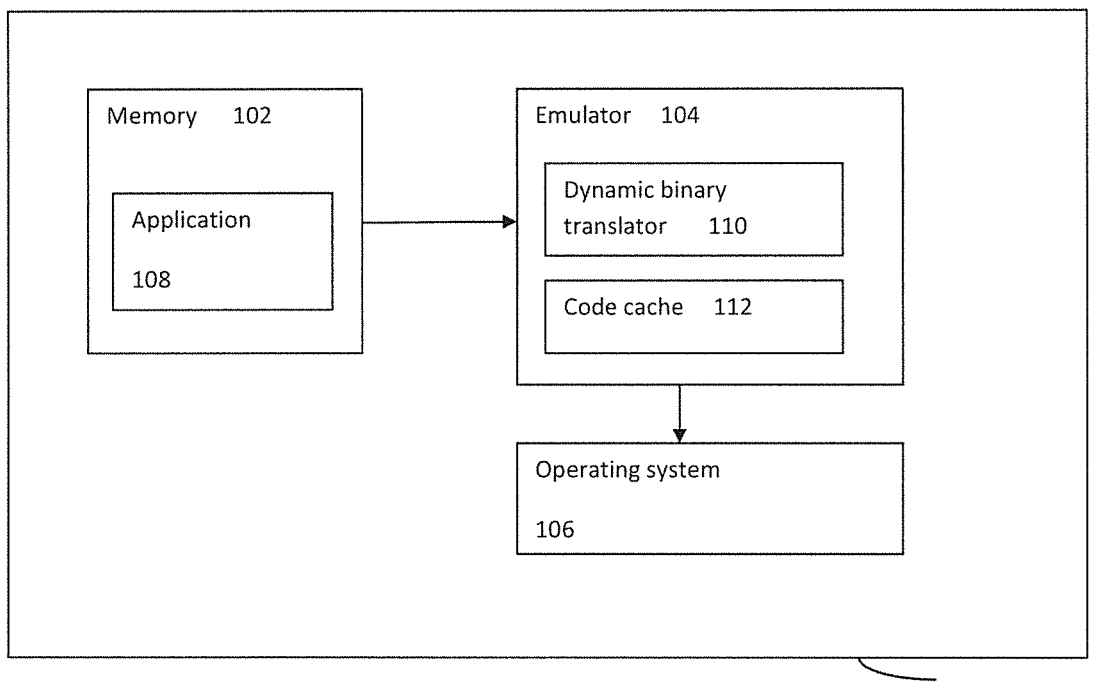
FIG. 1 is a block diagram of a computer system to preserve object code translations of a library for future reuse by an emulator, according to an example.

FIG. 1 is a block diagram of a computer system to preserve object code translations of a library for future reuse by an emulator, according to an example. Computer system 100 includes memory 102, an emulator 104, and operating system 106. Components of computer system 100 i.e. memory 102, an emulator 104, and operating system 106 may be operationally coupled to each other.

Computer system 100 may be a computer server, desktop computer, notebook computer, tablet computer, mobile phone, personal digital assistant (PDA), or the like.

Memory 102 may include a random access memory (RAM) or another type of dynamic storage device that may store information and instructions non-transitorily for execution by processor. For example, memory can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. Memory 102 may include a computer application (machine readable instructions) 108. In an implementation, computer application is written in a first format i.e. it is written in a language for a first architecture which is different from the architecture of a host computer system ("second architecture") such as computer system 100.

Emulator 104 may be hardware, software or a combination of the two that enables a computer to run programs for another platform. Emulator 104 translates the machine language of a foreign application into the machine language of the computer. In other words, emulator 104 imitates the functions of one computer system (the guest) in another computer system (the host), so that the emulated behavior resembles the behavior of the real system (the guest). In an implementation emulator 104 includes dynamic binary translator 110 and code cache 112. In an implementation, dynamic binary translator 110 translates a block of computer application (machine readable instructions) written for a first system architecture into a sequence of instructions for a second system architecture (for example, host architecture of computer system 100). The generated set of instructions may be stored into a memory buffer such as code cache 112.

Operating system 106 is the host operating system of computer system 100. In an implementation, operating system 106 is UNIX or UNIX-like operating system, such as but not limited to, HP-UX, Linux and BSD.

It would be appreciated that the system components depicted in FIG. 1 are for the purpose of illustration only and the actual components may vary depending on the system and architecture deployed for implementation of the present solution.

Figure 2:
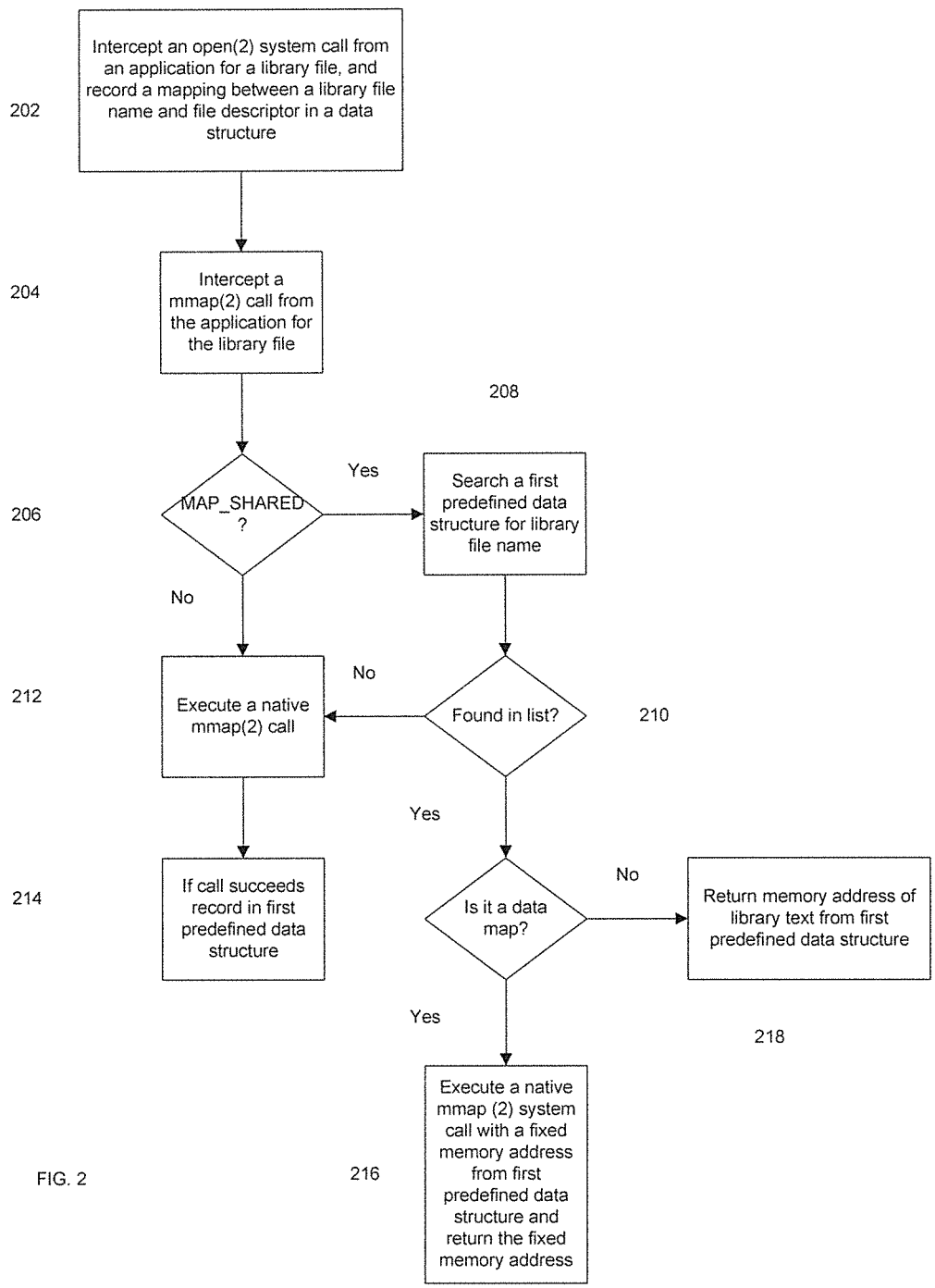
FIG. 2 illustrates a method of preserving object code translations of a library for future reuse by an emulator, according to an example.

FIG. 2 illustrates a method of preserving object code translations of a library for future reuse by an emulator, according to an example.

At block 202, an emulator intercepts an application's open(2) system call and records a mapping between a file descriptor and a file name ("absolute path name") in a data structure. In an implementation, aforesaid open(2) system call is for a library file. Also, in an implementation, the application whose open(2) system call is intercepted by an emulator is written in a first format i.e. it is written in a language for a first system architecture which is different from the architecture of the computer system ("second architecture") hosting the emulator.

The open(2) operating system call establishes the connection between a file name and a file descriptor. It creates an open file description that refers to a file and a file descriptor that refers to that open file description. The file descriptor may used by other I/O functions to refer to that file. In an implementation, open(2) is intercepted by an emulator and the emulator records a mapping between a file descriptor and a file name in a data structure in a predefined data structure which may be termed as "second predefined data structure". The file name is resolved to the absolute path name without symbolic links before recording it.

At block 204, the emulator intercepts a mmap(2) system call from the application for mapping a library file into a memory in a shared region of address space. In an implementation, aforesaid library file is the file for whom open(2) system call was previously intercepted by the emulator (at block 202). An mmap(2) system call creates a new mapping in the virtual address space of the calling process.

At block 206, it is determined if the mapping is shared. A flag property of mmap(2) call is checked to determine if flag MAP_SHARED has been specified in the call. Generally, if a mapping is shared it means that writes to that area in one process will affect other processes (that still have the same area mapped) and the underlying file. In other words, the flag MAP_SHARED specifies that writes to the memory region will be written back to the file and changes made will be shared with other processes mapping the same file.

In the present case, if it is determined that the mmap(2) call is for a library and the mapping is shared, the emulator identifies the absolute path name of the library from the file descriptor in the system call. Since a mapping between a file descriptor and a file name is maintained in the second predefined data structure, the emulator refers to aforesaid data structure for identifying the file name of the library from the file descriptor.

At block 208, the emulator refers to another predefined data structure, which may be termed as "first predefined data structure", to determine if the file name of the library is present in said data structure (block 210). In an implementation, a "first predefined data structure" is maintained by the emulator and each entry in the data structure may include file name of the library, file statistics of the library, the mapped memory addresses corresponding to the library text and library data, and a flag to indicate whether said mapped memory addresses are active or inactive.

If the file name of the library is not present in the first predefined data structure, a native mmap(2) system call is executed to map the library (block 212). If the call succeeds, and if it is MAP_SHARED, the mapping details are recorded in the first predefined data structure (block 214).

If the file name of the library is present in the predefined data structure then for a library data map, a native mmap(2) system call is executed with a "fixed" memory address (i.e. where the data was previously mapped) present in the predefined data structure, and the fixed memory address is provided to the application (block 216). If it is a library text map then the memory address where the library text was previously mapped is provided to the application (block 218).

Typically, dynamic load of library involves multiple system calls to map text, data etc. For data maps, the call may not provide the file descriptor. If this is the case, the emulator may choose to use the file descriptor passed to a previous mmap(2) call by the same thread. Details of the data map, such as address and size, are also stored in the first predefined data structure.

Figure 3:
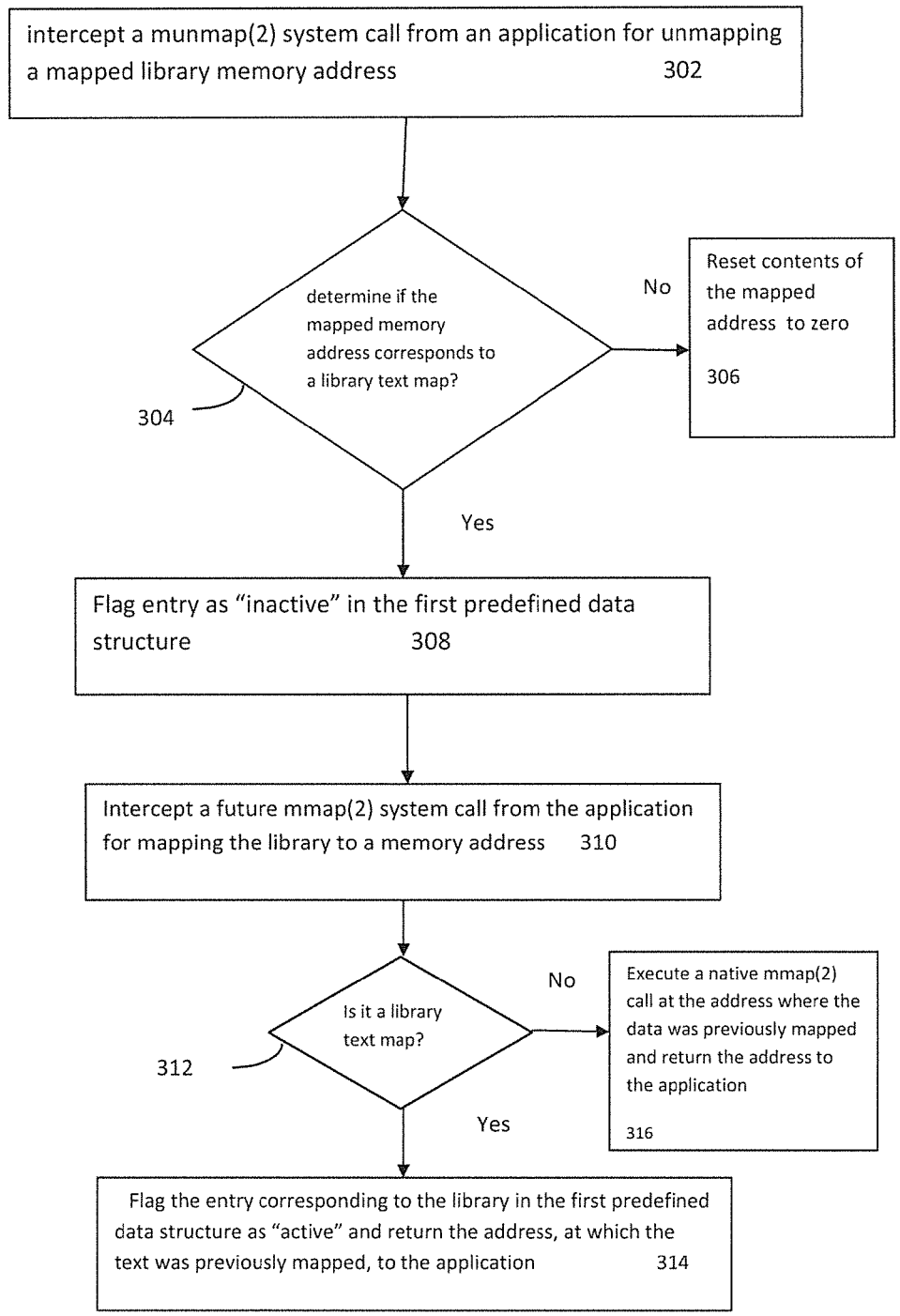
FIG. 3 illustrates a method of preserving object code translations of a library for future reuse by an emulator, according to an example.

FIG. 3 illustrates a method of preserving object code translations of a library for future reuse by an emulator, according to an example.

At block 302, the emulator intercepts a munmap(2) system call from the application (of FIG. 2) for unmapping a mapped library memory address. A munmap(2) system call unmaps files or devices into memory. In other words, the munmap(2) system call deletes the mappings for the specified address range.

At block 304, it is determined if an entry related to the mapped memory address is present in a first predefined data structure (described earlier). If said entry is present, it is determined if the mapped memory address corresponds to a library text map or library data map. If the mapped memory address corresponds to a library text map, said entry is flagged as "inactive" in the first predefined data structure, an object code translation of the library text is preserved in the mapped memory address (block 306). If the mapped memory address corresponds to a library data map, contents of the mapped address are reset to zero (block 308). In an implementation, a dummy mmap(2) call is used with the same fixed address and same length, relying on the property that mmap(2) calls can overwrite existing maps with zero without reporting an error. For both text and data, the virtual memory addresses still remain allocated and cannot be reused for subsequent memory allocations. The translations for the library text are not purged and remain in the emulator's code cache.

At block 310, the emulator intercepts a future mmap(2) system call from the application for mapping the same library to a memory address. If it is for a library text map (block 312), the entry related to the mapped memory address in the first predefined data structure is flagged as "active" and the mapped memory address corresponding to the library text is provided to the application (block 314). For a library data map, a native mmap(2) system call is executed by the emulator at the same address as where the data was previously mapped to overwrite the dummy map, and the address is provided to the application (block 316) If the list lookup and fixed data map succeed, the translations stored in the emulator's code cache could be considered as valid and can be reused. In this manner, over a period of time most of the library code could get translated and stored for future reuse.

Several error condition checks could be performed during the process in order to ensure validity. File statistics for the libraries (size, inode number and device, modification time) may be maintained in the first predefined data structure which could be compared before deciding to reuse the translations. If a file is found to have changed since a previous load, or if any of the data maps at fixed addresses fail, then the library translations could be purged. If the length (or flags) for the new mmap(2) calls are different from those stored in the library list, the translations could be purged. A purge could also be performed for cases that are not handled by the emulator (for example, too many mmap (2) calls for loading the same library) or when the emulator's data structures (such as code cache) overflow. In such cases the old maps are removed and new mmap(2) calls are made for the library.

The process also takes into account a scenario wherein an application may run out of virtual memory. In such case, if and when an emulator detects a failed mmap(2) or brk(2) system call from the application due to unavailability of memory, the emulator may purge the entire code cache and deallocate reserved maps. It may be noted that during a purge operation only inactive reserved maps (not the active ones) are deallocated.

It would be appreciated that the system components depicted in the illustrated figures are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method of preserving storage of object code translations of a library for future reuse by an emulator, comprising:
   intercepting a munmap(2) system call from an application for unmapping a mapped library memory address, wherein the mapped library memory address is associated with an entry in a first predefined data structure;
   determining if the mapped library memory address corresponds to a library text or library data;
   if the mapped library memory address corresponds to the library text, flagging said entry as inactive in the first predefined data structure, and preserving storage of an object code translation of the library text in the mapped memory address for future reuse by the emulator;
   if the mapped library memory address corresponds to the library data, resetting contents of the mapped address to zero;
   intercepting a future mmap(2) system call from the application for mapping the library to a memory address, wherein the future mmap(2) system call is intercepted after intercepting the munmap(2) system call;
   for the library text, flagging the entry as active and providing the mapped library memory address associated with the entry and corresponding to the library text to the application; and
   for the library data, executing a native mmap(2) system call at the mapped address corresponding to the library data.

2. The method of claim 1, wherein the first predefined data structure includes a file name of the library, file statistics of the library, the mapped library memory addresses corresponding to the library text and library data, and a flag to indicate whether said mapped library memory addresses are active or inactive.

3. The method of claim 2, wherein the file statistics of the library include file size, inode number and device, and modification time.

4. The method of claim 3, wherein the file statistics of the library are compared prior to reusing the object code translation of the library.

5. The method of claim 1, wherein the entry related to the mapped library memory address is recorded in the first predefined data structure by:
   intercepting a mmap(2) system call from an application for mapping the library;
   identifying a file name of the library;
   searching the file name of the library in the first predefined data structure;
   if the file name of the library is not present in the first predefined data structure, executing a native mmap(2) system call to map the library and recording mapping details in the first predefined data structure;
   if the file name of the library is present in the predefined data structure:
   for the library data, executing a native mmap(2) system call with a fixed memory address and providing the fixed memory address to the application; and
   for the library text, providing a memory address of the library text to the application.

6. The method of claim 5, wherein the file name of the library is identified from a file descriptor in the mmap(2) system call.

7. The method of claim 6, wherein an association between the file name of the library and the file descriptor is recorded in a second predefined data structure.

8. The method of claim 5, wherein the file name of the library is identified from a file descriptor shared during a previous mmap(2) system call.

9. The method of claim 1, wherein a dummy mmap(2) system call is used for resetting contents of the mapped address to zero.

10. A system for preserving storage of object code translations of a library for future reuse, comprising:
    a memory comprising an application written for a first system architecture;
    an emulator coupled to the memory, wherein the emulator comprises a dynamic binary translator to:
    intercept a munmap(2) system call from an application to unmap a mapped library memory address in a code cache, wherein the mapped library memory address is associated with an entry in a first predefined data structure;
    determine if the mapped library memory address corresponds to a library text map or library data map;
    if the mapped library memory address corresponds to the library text map, flag said entry as inactive in the first predefined data structure, and preserve storage of an object code translation of the library text in the mapped library memory address of the code cache for future reuse;
    if the mapped library memory address corresponds to the library data map, reset contents of the mapped address to zero;
    intercept a future mmap(2) system call from the application to map the library to a memory address;

for the library text map, flag the entry as active and provides the mapped library memory address corresponding to the library text map to the application; and for the library data map, execute a native mmap(2) system call at the mapped library address corresponding to the library data map.

11. The system of claim 10, wherein the dynamic binary translator translates the application written for the first system architecture into a sequence of instructions for a second system architecture.

12. The system of claim 10, wherein the first predefined data structure is maintained by the emulator.

13. A non-transitory machine-readable storage medium to preserve storage of object code translations of a library for future reuse, comprising instructions to:

intercept an mmap(2) system call from an application to map a library;

determine whether the library is associated with an entry in a first predefined data structure;

based on the determination that the library is not associated with the entry in the first predefined data structure, execute a native mmap(2) system call to map the library and generate the entry in the first predefined data structure with a file name of the library and a mapped memory address;

based on the determination that the library is associated with the entry in the first predefined data structure, distinguish a library text from a library data to:

for the library text, provide a previously mapped address for the library text to the application, wherein the previously mapped address for the library text is in the entry, and for the library data, execute a native mmap(2) system call with a fixed memory address and provide the fixed memory address to the application, wherein the fixed memory address is in the entry and indicates a previously mapped address for the library data;

intercept a munmap(2) system call from the application to unmap the library; and in response to the interception of the munmap(2) system call, for the library text, preserve storage of an object code translation of the library text for future reuse, and for the library data, reset the library data to zero.

14. The non-transitory machine-readable storage medium of claim 13, further comprising instructions to:

translate a block of machine-readable instructions written for a first system architecture into a sequence of machine-readable instructions written for a second system architecture; and store the translated sequence of machine-readable instructions in the code cache.

15. The non-transitory machine-readable storage medium of claim 13, further comprising instructions to:

in response to intercepting the munmap(2) system call, for the library text, flag the mapped memory address in the entry as inactive and preserve storage of the object code translation of the library text at the mapped memory address in the code cache.

16. The non-transitory machine-readable storage medium of claim 15, further comprising instructions to:

intercept a future mmap(2) system call from the application to map the library after intercepting the munmap(2) system call; and determine the entry associated with the library in the first predefined data structure and distinguish the library text from the library data to:

for the library text, flag the mapped memory address in the entry as active and provide the mapped memory address for the library text to the application, and for the library data, execute the native mmap(2) system call with the fixed memory address and provide the fixed memory address to the application, wherein the fixed memory address is in the entry and indicates the previously mapped address for the library data.

17. The non-transitory machine-readable storage medium of claim 13, further comprising instructions to:

in response to intercepting the mmap(2) system call to map the library, identify the file name of the library via a second predefined data structure, and determine whether the file name of the library is in the entry in the first predefined data structure.

* * * * *